(12) United States Patent
Hofer et al.

(10) Patent No.: US 9,166,506 B2
(45) Date of Patent: Oct. 20, 2015

(54) CONTROLLING A MULTIPHASE BRUSHLESS DC MOTOR FOR STAGING AND DRIVING A REMOTE-CONTROL VEHICLE

(71) Applicant: Castle Creations, Inc., Olathe, KS (US)

(72) Inventors: Richard A. Hofer, Gardner, KS (US); Jonathan R. Feldcamp, Gardner, KS (US)

(73) Assignee: CASTLE CREATIONS, INC., Olathe, KS (US)

( * ) Notice: Subject to any disclaimer, the term of this patent is extended or adjusted under 35 U.S.C. 154(b) by 325 days.

(21) Appl. No.: 13/753,913

(22) Filed: Jan. 30, 2013

(65) Prior Publication Data

US 2013/0234634 A1    Sep. 12, 2013

Related U.S. Application Data

(60) Provisional application No. 61/609,421, filed on Mar. 12, 2012.

(51) Int. Cl.
*H02P 6/00* (2006.01)
*H02P 6/14* (2006.01)
*A63H 30/04* (2006.01)
*A63H 29/22* (2006.01)

(52) U.S. Cl.
CPC *H02P 6/14* (2013.01); *A63H 29/22* (2013.01); *A63H 30/04* (2013.01)

(58) Field of Classification Search
CPC .............. H02P 6/14; H02P 6/06; H02P 6/182
USPC .................. 318/400.01, 400.07, 599, 400.32; 446/456, 440, 454, 460
See application file for complete search history.

(56) References Cited

U.S. PATENT DOCUMENTS

| | | | |
|---|---|---|---|
| 4,213,270 A * | 7/1980 | Oda ............................... | 446/456 |
| 5,065,078 A * | 11/1991 | Nao et al. ........................ | 318/16 |
| 5,195,920 A * | 3/1993 | Collier .......................... | 446/409 |
| 6,179,105 B1 * | 1/2001 | Haass .......................... | 191/22 R |
| 6,184,868 B1 * | 2/2001 | Shahoian et al. ............. | 345/161 |
| 6,390,883 B1 * | 5/2002 | Choi .............................. | 446/436 |
| 7,121,913 B2 * | 10/2006 | Yanagisawa ................... | 445/24 |

(Continued)

*Primary Examiner* — Rina Duda
(74) *Attorney, Agent, or Firm* — Shook, Hardy & Bacon L.L.P.

(57) ABSTRACT

Control of rotational speed of a motor is provided using an apparatus and method that provides a staging and a driving mode. A processor controls speed of the motor in three different modes to provide different control that is appropriate for different situations. Control-input indications are received by a processor indicating that a stepping mode is selected. In stepping mode, a sequence of commutation states are chosen in succession at a given stepping frequency for a given control selection. In an active-holding mode, the same phase in the commutation sequence is pulsed at low power to hold a motor location. In a closed-loop motor-control mode, the commutation state is sensed and state transition time is controlled relative to neutral timing. These modes may be used to advantage to simulate a drag race. An operator controls a remote-control vehicle in a stepping mode to drive toward a first beam at a drag start line. When the first beam at the start line is broken, but a second beam is not broken, the ESC begins to perform motor control to actively hold the vehicle in position until the race starts. After the race starts, the ESC receives a control-input indication to drive the motor in a closed-loop motor-control mode.

21 Claims, 7 Drawing Sheets

(56) References Cited

U.S. PATENT DOCUMENTS

| | | | |
|---|---|---|---|
| 7,303,459 B2 * | 12/2007 | Yamaguchi | 446/454 |
| 7,400,103 B2 | 7/2008 | Hofer | |
| 7,579,796 B2 | 8/2009 | Hofer | |
| 8,030,871 B1 * | 10/2011 | Young et al. | 318/461 |
| 8,545,284 B2 * | 10/2013 | Baarman et al. | 446/444 |

* cited by examiner

CONTROLLING A MULTIPHASE BRUSHLESS DC MOTOR FOR STAGING AND DRIVING A REMOTE-CONTROL VEHICLE

This application claims the benefit of U.S. provisional application No. 61/609,421, filed Mar. 12, 2012, which is incorporated by reference herein.

SUMMARY

In one aspect computer-readable media have instructions to enable a processor to perform a method of motor control. The processor receives a signal that indicates an operator's desire to run the motor in a stepping control mode. The processor runs the motor in a stepping control mode: for example, providing low speed control as the motor comes to a stop such as might be used in a remote-control vehicle that approaches a start line. The processor receives a signal that indicates an operator's desire to run the motor in an active-holding control mode. The processor runs the motor in an active-holding control mode: for example, periodically providing a holding power pulse such as that which is able to hold a remote-control vehicle in position for the start of a drag race. The processor receives a signal that indicates an operator's desire to run the motor in a closed-loop motor-control mode. The processor senses commutation state and runs the motor in the closed-loop motor-control mode, for example, providing a high duty-cycle control mode that allows a racer to carefully control power and efficiency during a remote-control vehicle race.

Other advantages will become apparent from the following description taken in connection with the accompanying drawings, wherein is set forth by way of illustration and example, an embodiment as described herein.

DETAILED DESCRIPTION

The subject matter is described with specificity herein to meet statutory requirements. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

As described herein, an electronic processor performs embedded control. An embodiment of a processor is a microprocessor that utilizes software to implement features as described herein. A processor is described herein in the general context of computer-executable instructions, such as program modules, being executed by a computer. Generally, program modules include, but are not limited to, routines, programs, objects, components, and data structures that perform particular tasks or implement particular abstract data types. Processor operations may also be implemented using programmable logic, a hardware logic processor, state machine, or microsequencer.

Likewise, the functions allocated to hardware may instead be implemented in software or implemented as a combination of hardware and software. Such alternatives are well within the scope of the embodiment contemplated and intended for practicing the features described herein. An embodiment of a computer-readable media include server memory or fixed disks that store digital structures in an update server to be downloaded into an embedded motor controller. An embodiment of computer readable media includes embedded RAM or ROM within a programmer, personal computer, cell phone, or palmtop computer for downloading information to a module that performs motor control. An embodiment of computer-readable media includes RAM or ROM within a processor, or on a processor board.

One method known to control a three-phase brushless motor is to detect the zero-crossing event between a floating or released phase of the motor and the neutral phase. When the voltage on the released phase crosses the neutral phase, the next phase is commutated after a predetermined delay period. Each phase is, in turn, driven, released, tied to ground, and released. The output of a comparator on each of the phases is used for comparison to the neutral voltage.

Figure 1:
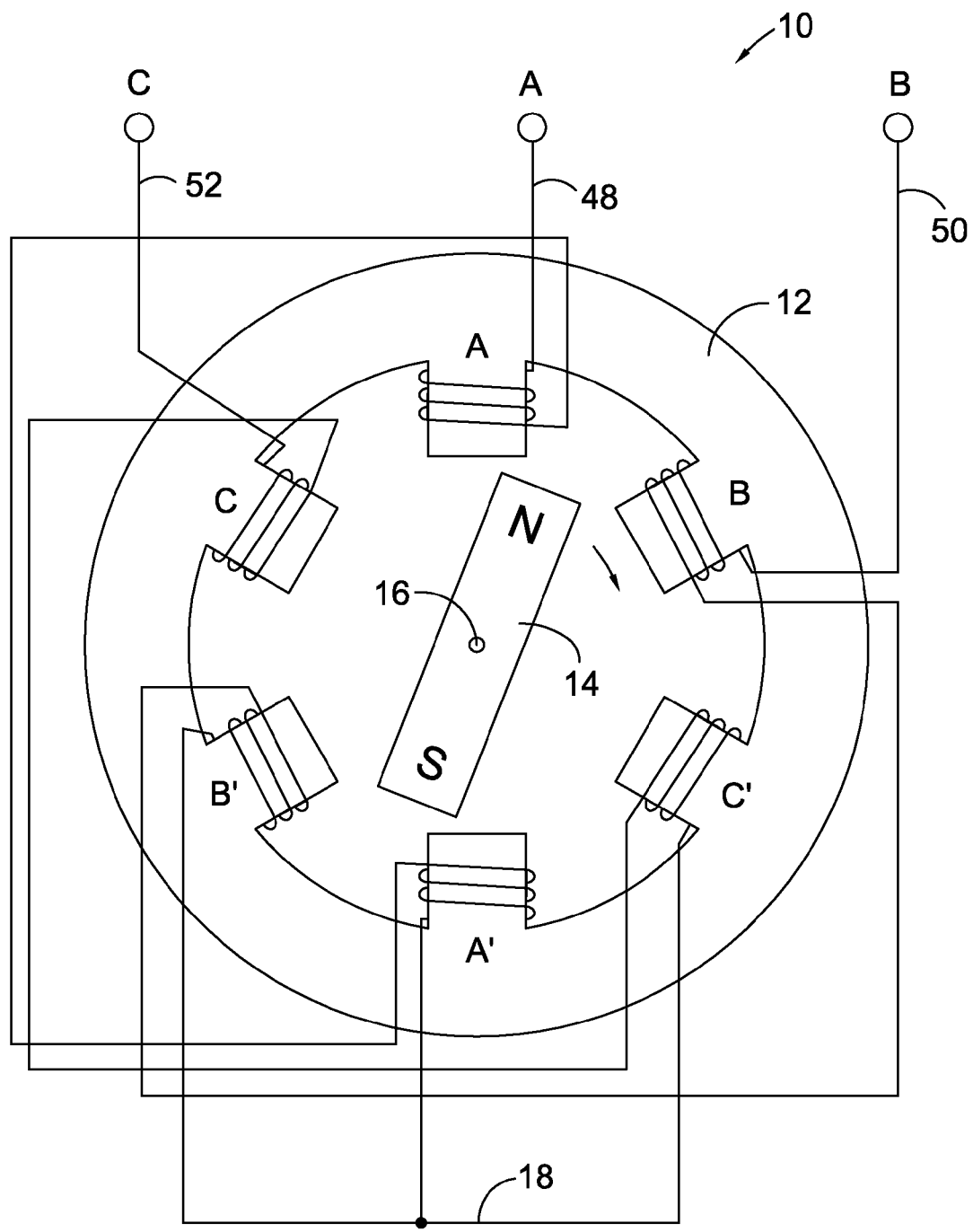
FIG. 1 is a diagrammatic illustration of a three-phase, direct-current, brushless motor in accordance with an exemplary embodiment as described herein.

Referring to FIG. 1, a brushless DC motor is generally indicated by reference numeral 10. Motor 10 includes three pairs of windings or coils A-A', B-B' and C-C' on a stator 12 surrounding a rotor 14. Rotor 14 is shown diagrammatically as a bar magnet having a north and a south pole and secured to a shaft 16. Each of the pairs of windings or coils A and A', B and B' and C and C' is connected in series in one embodiment.

The coils of each pair are wound in opposite directions so that a current through the pairs of windings creates electromagnet poles of opposite polarity on the stator 12. By creating electromagnet poles on the stator 12 that attract and/or repel those of the rotor 14, the rotor 14 may be made to rotate by successively energizing and de-energizing the phases. The free ends of coils A', B' and C' are connected together as illustrated at 18 in one embodiment. An embodiment of motor 12 permits coils to be controlled individually. An embodiment of motor 12 uses a different number of coils such as 3, 4, 8, or 12.

Figure 2:
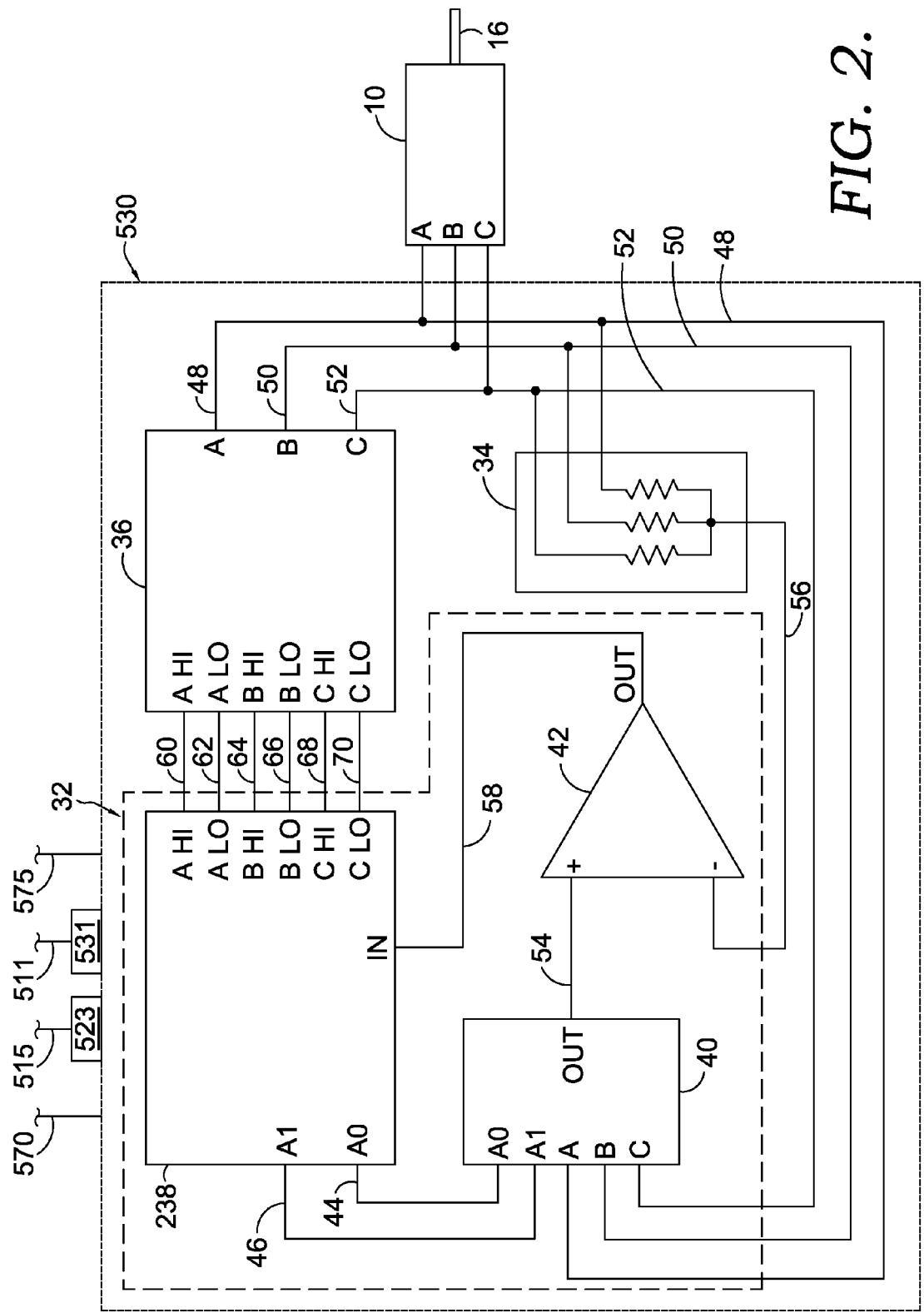
FIG. 2 is a schematic of the control circuit for the motor of FIG. 1 in accordance with an exemplary embodiment as described herein.

Referring to FIG. 2, a control circuit for motor 10 is generally indicated by reference numeral 530. Controller 530 includes a microcontroller circuit 32, a neutral-phase circuit 34 and a power-stage circuit 36. Microcontroller circuit 32 includes a processor 238, an analog multiplexer 40 and a comparator 42.

Processor 238 controls the comparison select outputs A0 and A1 to multiplexer 40 on lines 44 and 46, respectively. Accordingly, a digital input to multiplexer 40 is provided on lines 44 and 46 to control the selection of which the phases A, B or C, on power stage output lines 48, 50 and 52, respectively, is output on line 54.

Comparator 42 compares the multiplexer output voltage on line 54 with the output of the neutral phase circuit 34 on line 56. An output is generated on line 58 which is input to the processor 238 that represents the greater of voltages on 54 and 56.

Processor 238 also controls the output on lines 60, 62, 64, 66, 68 and 70 which are input to the power stage circuit 36. Based on the inputs on lines 60, 62, 64, 66, 68 and 70, the power stage circuit 36 selectively controls the current and voltage for phases A, B and C on lines 48, 50 and 52, respectively.

Figure 3:
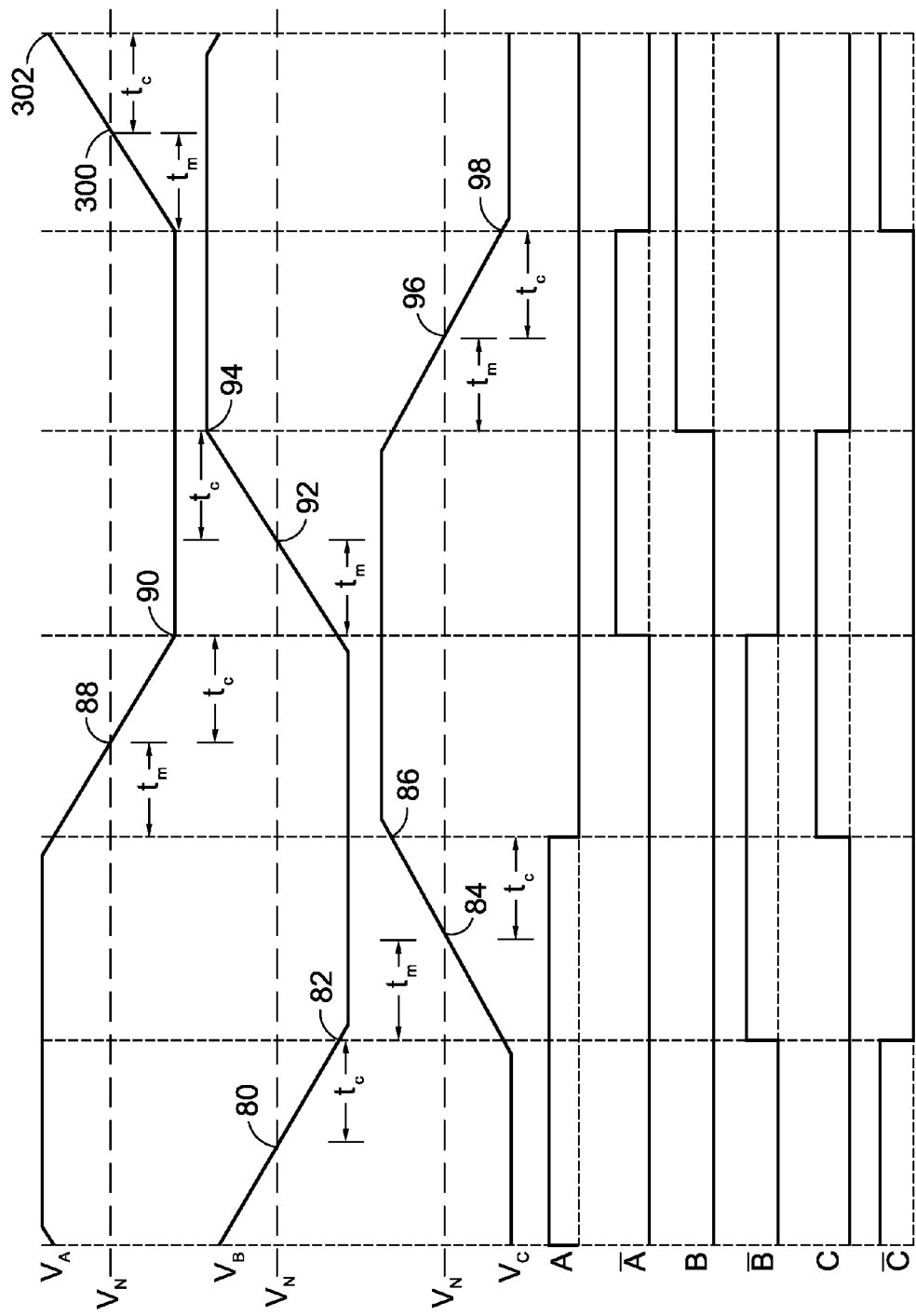
FIG. 3 is a graphical illustration of the applied and measured voltages for the windings of the motor of FIG. 1 in accordance with an exemplary embodiment as described herein.

Referring to FIGS. 1-3, in order for the motor shaft 16 to turn in a desired direction, the phases A, B and C are activated in a specific order called the commutation sequence. As shown in FIG. 3, this sequence is $A\overline{C}$, $A\overline{B}$, $B\overline{C}$, $\overline{A}C$, $\overline{A}B$, $B\overline{C}$, and repeats thereafter.

In the first period of the sequence, processor 238 outputs a signal on lines 60 and 70 to power-stage circuit 36 which applies a positive voltage to phase A on line 48, and a negative voltage to phase C on line 52. As the rotor 14 turns, a voltage is induced in the phase B windings which falls as the north pole of the rotor 14 passes. The neutral voltage ($V_N$) on line 56 is compared by comparator 42 to the back EMF phase B voltage on line 50 through multiplexer 40 and output on line 54. When the voltages on line 54 crosses the voltage on line 56, indicating a zero crossing point 80 (FIG. 3), an output on line 58 is generated and input to processor 238.

Processor 238 waits a predetermined period of time (discussed below) for the next commutation. At the first commutation point 82, shown in FIG. 3, processor 238 outputs a signal on line 66 and removes the signal on line 70 to power-stage circuit 36, which applies a negative voltage to phase B on line 50 and phase C on line 52 is allowed to float. The processor 238 signals multiplexer 40 on lines 44 and 46 to switch the output on line 54 to phase C on line 52.

As the rotor 14 continues to turn, a voltage is induced in the phase C windings. When the back EMF voltage on line 52 through multiplexer 40 to line 54 crosses the neutral voltage on line 56 indicating a zero-crossing point 84, an output is generated on line 58 from comparator 42 to processor 238.

The time from commutation point 82 until zero crossing point 84 is measured ($t_m$) by processor 238. The commutation time ($t_c$) is set to the measured time $t_m$ and the processor 238 waits the commutation period for the next commutation. At the next commutation point 86, a signal is generated by processor 238 on line 68 and removed from line 60 to power stage circuit 36, which applies a positive voltage to phase C on line 52 and removes a voltage on line 48 to allow phase A to float. The processor 238 signals on lines 44 and 46 to multiplexer 40 to switch the output on line 54 to phase A on line 48.

Processor 238 measures the time from commutation point 86 until the zero crossing point 88 for phase A. The commutation time is set to this measured time and the processor 238 waits the commutation time period for the next commutation. At the next commutation point 90, phase A is set to a negative voltage and phase B is allowed to float.

When the back EMF voltage on line 50 is crosses the neutral voltage on line 56, processor 238 waits for the measured period of time from commutation point 90 to the zero-crossing point 92 for the next commutation at point 94. At point 94, a positive voltage is applied to phase B, and phase C is allowed to float.

Processor 238 measures the time from commutation point 94 until the zero-crossing point 96 for phase C. The commutation time is set to this measured time and the processor 238 waits the commutation time period for the next commutation. At the next commutation point 98, a negative voltage is applied to phase C and phase A is allowed to float. The back EMF voltage on line 48 is compared to the neutral voltage on line 56. Once the zero-crossing point 300 for phase A is reached, the processor 238 waits the measured time period from point 98 to point 300 for the next commutation point 302.

At commutation point 302 a positive voltage is applied to phase A on line 48 and phase B is allowed to float. The cycle is then repeated. This control technique is one embodiment of a "high duty-cycle" technique. The duty cycle for this embodiment of a high duty-cycle control technique may approach 100% because the unused phase is monitored at the same time that power is applied to two other phases.

Each zero-crossing event occurs 60 degrees before the rotor 14 moves to a point where the current phase activation will begin slowing down the rotor and where the next phase activation produces the maximum torque. If the processor 238 waits for 100% of the measured time, the motor will be running a neutral timing. Neutral timing is generally the most efficient mode for running the motor. However, more power can be gained by waiting only a fraction of that time, which is referred to as "advanced timing."

If the time to commutate to the next phase is only 50% of the measured time, the timing is advanced for some motors by about 15 degrees. An embodiment of processor 238 provides a transfer curve over at least part of a control range in which the amount of timing advance is controlled to provide additional power to the motor 10 so that a remote-control vehicle is propelled in a manner to give the shortest time in a race. An embodiment allows processor 238 to control the amount of timing advance in a transfer curve over a range of throttle control.

A high duty-cycle technique is one example of a closed-loop motor-control mode wherein processor 238 senses commutation state using multiplexer 40 and monitors the output of comparator 42. An embodiment of a closed-loop motor-control mode also includes other methods of sensing commutation state and controlling a multiphase motor such as that disclosed in issued U.S. Pat. No. 7,400,103 filed Aug. 8, 2006 which is incorporated herein by reference.

An active-holding motor-control mode periodically pulses a given phase in a commutation sequence with a low-power pulse to "hold" the motor in the given commutation state. An embodiment of motor control uses a six-phase state sequence. Suppose the given state is $A\overline{B}$. A positive voltage is applied to the A coil 48 and a negative voltage is applied to the B coil 50 for a very short period of time that is selected to provide a given average power to hold the commutation state at $A\overline{B}$. An embodiment of motor control pulses a single coil such as the A coil 48. An embodiment of motor control uses an alternative single coil pulsing commutation sequence such as C, A, B, $\overline{C}$, $\overline{A}$, $\overline{B}$. An embodiment of a controller 530 controls the pulsing power for a hold phase by limiting the pulse on time, and setting a fixed number of hold pulses per second. An embodiment of motor control allows the hold power to be adjusted according to a programmable setting. An embodiment of motor control allows the pulse repetition frequency to be adjusted by a programmable setting.

An embodiment of motor control adjusts the holding-mode power carefully to effect a favorable tradeoff between heating and holding energy. Brushless motors can have very low resistance, and therefore, they can draw very large amounts of current during the pulse on-time. An embodiment of a motor control selects the holding power high enough to provide a minimum holding energy, but low enough so that controller 530 and motor 10 do not get too hot. An embodiment of motor control adjusts the hold-mode power based on input voltage, motor resistance, and vehicle used. An embodiment of motor control tests the minimum hold-mode force by setting the vehicle on a 5-degree incline and using a power level that successfully holds the vehicle in place.

An embodiment of the commutation sequence operates below a duty cycle of 100%. An embodiment of a commutation sequence draws voltages from the commutation state while applying two voltages to two phases simultaneously, defining the on-time of a Pulse Width Modulation (PWM) pulse. During the off-time one of the two phases remains tied to either high or low polarity, but no drive is supplied during off-time since the one or both of the other phases are left floating. An embodiment of motor control pulses one phase at a time.

An embodiment of motor control chooses the PWM frequency as a tradeoff considering power dissipation and audible noise. A PWM frequency that is too low results in longer on-times for the switching transistors and creates excessive heat in controller 530. Lower frequencies can also be audible and noise is usually undesirable. A PWM frequency that is too high results in more switching losses, which also creates heat in controller 530. An embodiment of motor control uses a PWM frequency of about 12 kHz. That is, PWM frequency is generally chosen to be in a range from 5 kHz to 30 kHz. For different motors, an embodiment of motor control adjusts the PWM frequency to account for variations in motor 10 and/or controller 530.

A stepping motor-control mode periodically steps from one commutation state to a succeeding commutation state at a "stepping frequency" to achieve a controlled number of commutation states per second. For example, a stepping frequency of 1 advances to the next adjacent step in a commutation state at a rate of one step per second, while a stepping frequency of 50 advances from one commutation state to the next at a rate of 50 steps per second, thus changing state at a nominal interval of one-fiftieth of a second. An embodiment of stepping provides a minimum stepping frequency of ¼ to 1 step per second. An embodiment provides a maximum stepping frequency of 25 to 200 steps per second. An embodiment of stepping allows the minimum and maximum stepping frequency to be controlled as a programmable setting. An embodiment of stepping provides a different or broader range of control.

An embodiment of the stepping motor-control mode adjusts the pulsing-power level used as a function of the step frequency. An embodiment of a stepping motor-control mode takes an input-control signal that varies over an interval, and uses at one signal endpoint a minimum step frequency of one and at the other signal endpoint a maximum step frequency of 50. An embodiment of stepping control defines a number (e.g., 5 or 6) of intermediate control points at intermediate input-signal levels between the signal endpoints and maps a signal in the interval to a step frequency between the minimum and maximum step frequency, defining selected step frequency for an intermediate point based on a linear interpolation between defined control points.

An embodiment of stepping control provides a fine-grained transfer function with hundreds of intermediate points. An embodiment of stepping control does not interpolate but uses a fixed output over a small range of input. An embodiment of stepping control uses a logarithmic or algebraic function to interpolate commanded control. An embodiment of stepping control likewise defines output power level at each endpoint and intermediate point and produce output power level as an additional output based on an additional interpolation function. An embodiment of stepping control determines a commanded stepping frequency as an interpolation, and then determines power level as a function of stepping frequency and input voltage level.

An embodiment of the stepping motor-control mode does not transition from one commutation state to a succeeding commutation state as a step function but continuously varies the pulsing of a first state and a second state as a function of time. For example, at a first time instant, all of the pulses use state $A\overline{B}$. One quarter of a time interval into the future, three quarters of the pulses use state $\overline{B}C$, while one quarter of the pulses use state $A\overline{B}$. One half of a time interval into the future, one half of the pulses use state $A\overline{B}$ and one half of the pulses use state $\overline{B}C$. The mapping continues in this fashion until at one time interval into the future the pulses are all $\overline{B}C$. An embodiment of stepping control uses algebraic or sinusoidal transitions between states rather than linear.

An embodiment of providing pulse power level adjusts the power level used for either the holding mode or the stepping mode as a function of supplied voltage level. Control requirements typically remain constant as input voltage varies (e.g., supply voltage variation, battery decay, battery swapout.) An embodiment of providing pulse power level dynamically changes the amount of hold power $P_H$ as a function of a programmable constant $C_1$ and the input voltage $V_f$.

$$P_H = C_1 * V_f$$

An embodiment of the step-mode power compensation determines a step-mode push power $P_{PP}$ and a step-mode hold power $P_{HP}$. An embodiment of power selection adjusts the current step-mode push power and step-mode hold power as a function of the current stepping frequency or speed S. The push time is a period at the beginning of a step interval where higher power is applied in order to get the rotor to advance to the next commutation position. After the push-time pulses, hold-time pulses are generated to keep the rotor in position until the next step. The amount of power used during push time and repeated at the PWM frequency is denoted $P_{PP}$. An embodiment of power selection uses:

$$P_{PP} = (C_2 * S + C_3/S + C_{O1}) * V_f$$

The amount of power used during hold time and repeated at the PWM frequency is denoted $P_{HP}$. An embodiment of power selection uses:

$$P_{HP} = (C_4 * S + C_5/S + C_{O2}) * V_f$$

In general, the constants $C_1$, $C_2$, $C_3$, $C_4$, $C_5$, $C_{O1}$, and $C_{O2}$ are chosen to provide smooth control and consistent quality across performance. An embodiment of power selection allows one or more of these constants to be programmed by a user. An embodiment of power selection chooses $C_5$ and $C_3$ to be zero. An embodiment of power selection uses $C_2$ and $C_4$ to be zero. An embodiment of power selection chooses $C_2$ and $C_4$ as negative constants. An embodiment of power selection uses $C_3$ and $C_5$ as negative constants. An embodiment of power selection chooses $P_{PP}$ and $P_{HP}$ using a look-up table instead of an equation. An embodiment of power selection combines equations and table look-up operations.

Figure 4:
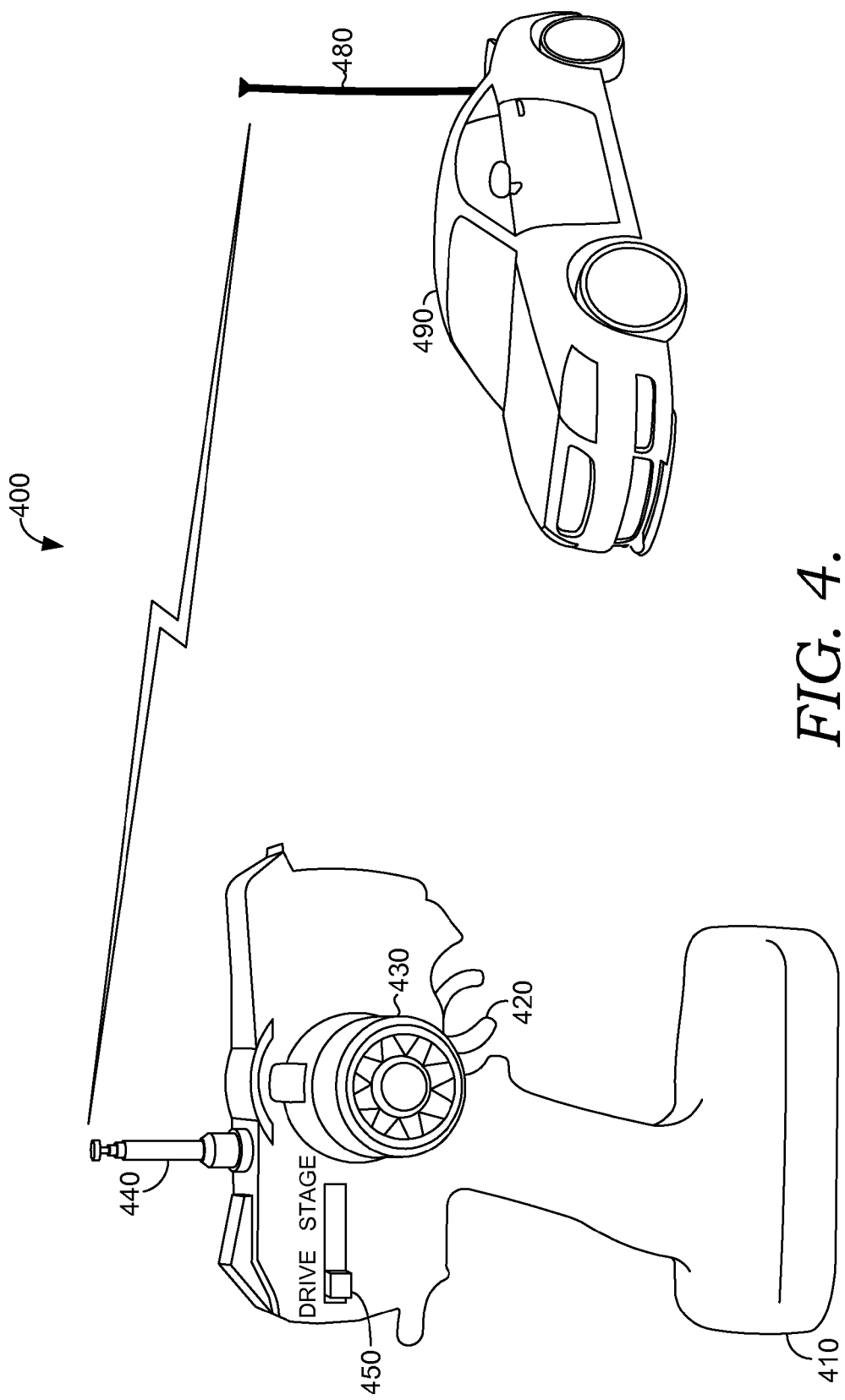
FIG. 4 is an exemplary hobby electronic system utilizing a remote-control transmitter in accordance with an embodiment as described herein.

Turning now to FIG. 4, there is shown in 400 an exemplary hobby electronic system using a remote-control transmitter in accordance with an embodiment as described herein. A remote-control transmitter 410 provides a number of controls such as throttle trigger 420, steering wheel 430 and mode switch 450. The controls 450, 420, and 430 are exemplary of controls employed for remote-control transmitter 410 that might also include discrete controls 450 implemented as a momentary switch, a mouse button, a slider, a toggle switch, a dip switch, a software mode switch, a programmable touch switch, and equivalents.

Continuous controls 420 and 430 are exemplary of controls employed for remote-control transmitter 410 that might also be derived from a combined X-Y control, so that exemplary continuous control 420 might be a joystick, a lever, a pedal, a touch-sensitive surface, a mouse, a trackball, and equivalents. A user handles remote-control transmitter 410 providing remote-control inputs such as trigger deflection of trigger 420 from a neutral position to a forward position to indicate vehicle throttle level forward, or deflection to an opposing reverse position indicative of requested vehicle throttle level in the reverse direction.

Remote-control transmitter 410 accordingly transmits through antenna 440 an indication of said control input such as a transmitted radio-control signal that is received by remote-control vehicle 490 at antenna 480. Remote-control vehicle 490 then interprets the control-input indication to produce a resultant control-input indication and applies motor controls to an internal DC motor 10. Vehicle 490 interprets a commanded deflection of trigger 420 as a corresponding control-input indication to move vehicle 490 at the commanded throttle level and translating the indication into a coordinated control provided to an internal motor 10.

In an embodiment of motor control, a user selects switch 450 to the "stage" position to command the remote-control system to perform in a staging mode as part of a standard NHRA dragrace staging process. Controller 238 selects either a stepping mode or a holding mode to effect slow speed and accurate position control of motor 10. Remote-control vehicle 490 is advantageously controlled in a stepping mode at about 50 commutation steps per second when the leading edge of remote-control vehicle 490 is about 10 feet away from the start line of the drag race. According to the staging process of an illustrative drag race, a vehicle must be pulled forward until a first beam is broken and then the vehicle must be stopped before a second beam is broken.

Advantageously, the user indicates through trigger 420 a decreasing throttle in the stepping mode as his vehicle approaches the first start beam and then the user finally indicates a motor-control hold mode while waiting for the race start. In an embodiment of motor control, the user indicates a desire to run in a drive mode through the selection of the "drive" state of switch 450. In an embodiment of motor control, the vehicle is still actively held in position through an active-holding motor-control mode as the user awaits a green light.

According to drag race rules for example, a user is given a start green-light through a "Christmas tree" type column of lights to start the race, and laser beams measure the start to see that it is fair so that the first beam is broken by a driver, but so that a second beam is not broken until a legal time following the race start indication is given by the column of lights. After the race start indication is given, the driver provides control input indications through remote-control transmitter 410 so that the vehicle proceeds as fast as possible using a closed-loop motor-control mode to proceed toward the drag race finish line in the shortest time possible.

Figure 5:
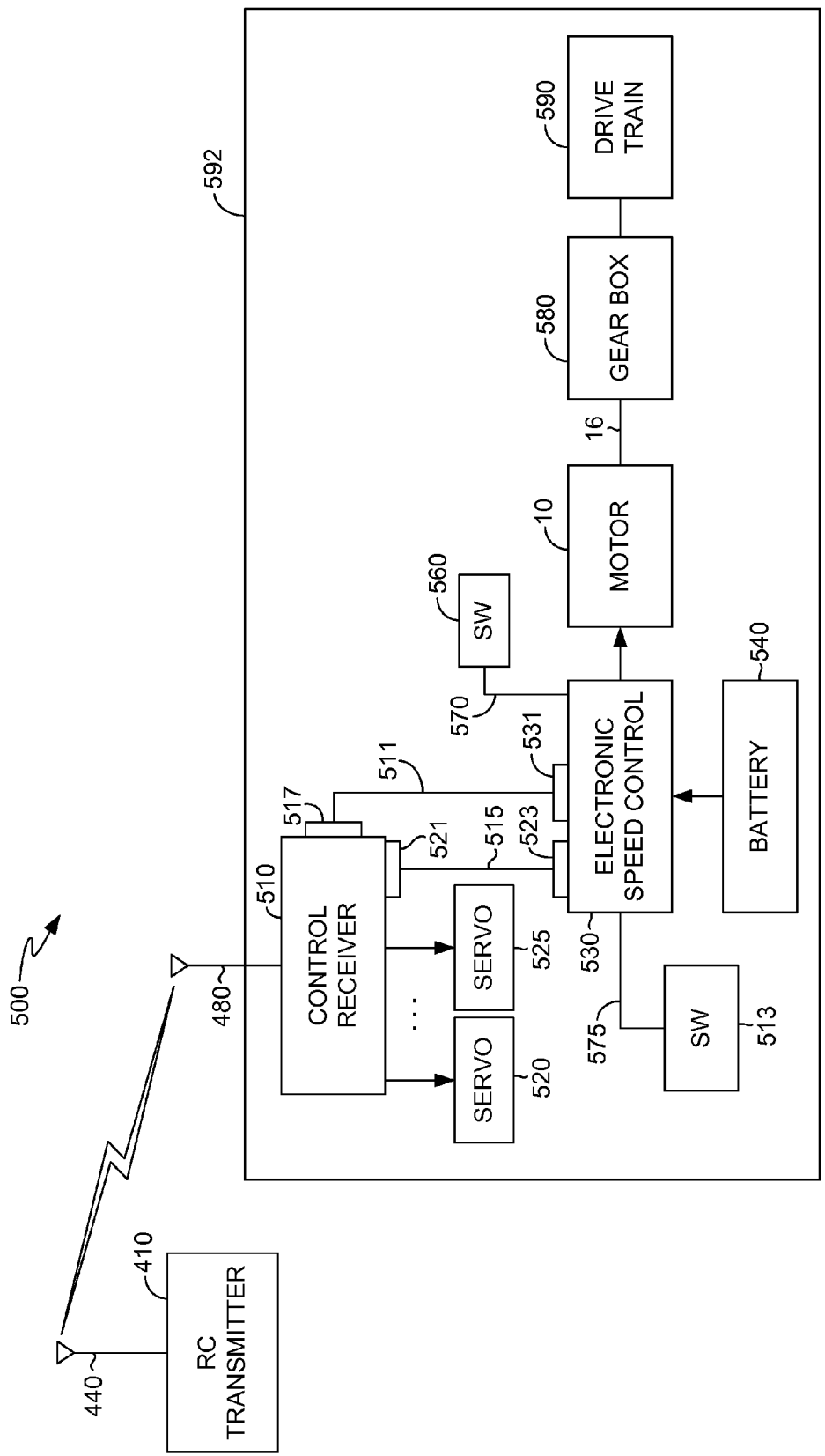
FIG. 5 is a block diagram of representative system elements of an exemplary electronic hobby system utilizing a remote-control transmitter in accordance with an embodiment as described herein.

Turning now to FIG. 5, there is depicted in 500 a block diagram of various components of a hobby electronic-control system illustrating an embodiment as described herein. An electromechanical control system 592 receives radio control signals through antenna 480 and processes control-input indications in control receiver 510. The electromechanical control system 592 propels the vehicle 490 using a throttle indication. The radio-control signals are received by control receiver 510 and provided to electronic speed control (ESC) 530, which interprets control indications to select a control mode and to apply control signals to motor 10 resulting in rotation of a shaft 16 that translates rotational movement through gear box 580 to apply to drive train 590, thus performing forward and reverse movement of the radio-control vehicle 490.

An embodiment of gear box 580 provides a gear ratio to give one quarter inch of forward movement per step. An embodiment of gear box 580 provides a gear ratio to give forward movement steps below three quarters of an inch per step. An embodiment of a vehicle supplies electrical DC power from battery 540 to electrical components such as control receiver 510, servos 520 and 525, motor 10, and ESC 530. Power is controlled to the entire unit through Switch 513 that provides on/off indication through interface 575 to ESC 530.

An embodiment of control receiver 510 receives FM radio signals that encode seven parallel channels of independent analog control states. Each control channel in the frame updates at a 50 Hz rate. Each channel is encoded using pulse period modulation (PPM) nominally continuous between 1 ms and 2 ms with a center of 1.5 ms. An embodiment of control receiver 510 demultiplexes a control indication corresponding to steering wheel 430 to control a steering servo such as 520 to steer vehicle 490 left or right.

An embodiment of control receiver 510 provides a PPM control-input indication to ESC 530 over connector 517 through a wired interface 511 to connector 531. An embodiment of wired interface 511 includes a three-wire interface consisting of power, ground, and signal indication. An embodiment of wired interface 511 provides control using pulse width modulation (PWM), RS232, SPI, I2C, analog voltage, live data encoding link, or other equivalent control signals. An embodiment of control receiver 510 provides a single PPM control input indication over the signal wire of a signal and ground combination in two-wire interface 515 that provides signaling from control receiver 510 through connector 521, through control interface 515 to control interface 523. An embodiment of control receiver 510 provides a single PPM control input indication over a signal wire of interface 515 that provides signaling from control receiver 510 through connector 521, through control interface 515 to control interface 523.

An embodiment of control receiver 510 multiplexes two PPM signals over 511 to connector 531, providing a first and a second control indication to ESC 530. In such a case, ESC 530 receives the two control indications, demultiplexes the two control signals and interprets the two signals as providing two different control-input indications as different channels of control. An embodiment of ESC 530 uses a frame repetition rate that is lower such as 1 Hz or 10 Hz, while others use a higher frame repetition rate such as 200 Hz. An embodiment of ESC 530 uses a different minimum and a different maximum, and a different range, such as 0.9 ms, 2.1 ms and 1.2 ms respectively.

In an embodiment, a first device, e.g. 510 encodes and decodes live data using pulse position modulation (PPM) in communication with a second device such as 530. In an embodiment device 510 and device 530 are each assigned complementary positions for encoding data within a repeating frame. Following a detected rising edge received by a receiving device such as 530, a timer is started that waits a fixed period, such as 500 microseconds, and then after a variable period between 0 ms and 5 ms, a short pulse, or glitch is encoded by a sending device such as 510 by bringing a bidirectional data path to a low value for a short period of time such as 10 us. The variable period of time after the waiting period and before the glitch is measured by a receiving device such as 530, and used as an indication of live data received from device 510. A repeating frame of N different variables are successively encoded by a predetermined encoding device allowing a receiving device such as 530 to detect each internal variables of a sending device such as 510. Each variable has a variable sequence number k indicating the position within a frame. For example, for a frame of N=18 variables, different variables can be transmitted from a sending device such as 510. The first variable sequence (k=1) does not send any pulse at all, to allow a reset of the frame, and to indicate that the next sequence is the beginning of encoded data. In an embodiment, the next variable sequence (k=2) encodes a time of 1 ms by device 530 to allow for calibration of time scale. The next variable sequence (k=3) encodes by device 530 the battery voltage measured during Field Effect Transistor (FET) off time when at partial throttle. The next variable sequence (k=4) encodes by device 530 a ripple voltage, which is the difference between battery voltage measured during FET on time and FET off time. The next variable sequence (k=5) allows for the encoding by device 530 of an indication of current as measured at the ESC. The next variable sequence (k=6) allows device 530 to encode a variable to indicate the control pulse received as measured by the ESC. The next variable sequence (k=7) indicates the ESC current output power percentage. The next variable sequence (k=8) indicates the current electrical RPM of the motor attached to the ESC, as encoded by device 530. The next variable sequence (k=9) allows device 530 to indicate the BEC Voltage, or the present voltage of the ESC's BEC. The next variable sequence (k=10) allows device 530 to indicate the BEC Current, the present amount of current that is being provided by the ESC's BEC. The next variable sequence (k=11) allows device 530 to encode either temperature or a calibration value. When the ESC has a linear temperature sensor, this is encoded by device 530 here. Otherwise, a 0.5 ms calibration pulse is encoded by device 530 to permit the second value of a 2 point calibration. The next variable sequence (k=12) allows device 530 to encode either a temperature or a calibration value. When the ESC has a Negative Temperature Coefficient (NTC) temperature sensor, this is encoded here. Otherwise, a 0.5 ms calibration pulse is encoded to permit the second value of a 2 point calibration. The next variable sequence (k=13) allows a controlling device such as 510 to encode a setting number to change. The next variable sequence (k=14) allows a controlling device such as 510 to encode a new value for the setting indicated in the prior sequence. The next variable sequence (k=15) allows a controlling device such as 510 to repeat the encoding of the setting number indicated also in sequence k=13. The next variable sequence (k=16) allows the controlling device such as 510 to repeat the value that was also sent in sequence k=14. The next sequence value (k=17) allows device 530 to indicate a valid received setting number. Embodiments encode the setting number received by device 530 in the sequences k=13 and k=15. The next sequence value (k=18) allows device 530 to indicate a valid receive value. Embodiments encode the value received in sequences k=14 and k=16.

A decoding device such as device 530 decodes information received from a wired bidirectional digital data bus received through a bidirectional line of interface 511. A device using the data frame such as device 510 or device 530 identifies beginning of frame (k=1) by detecting a reset (no glitch). A decoding device such as 510 calibrates all values by taking the second sequence variable (k=2) as encoding a 1 ms pulse and the smaller of the 11$^{th}$ and 12$^{th}$ sequence variable (k=11 and k=12) as encoding a 0.5 ms pulse. The receiving device such as device 530 measures a linearly encoded value between a minimum and a maximum allowed, and determines a linearly deflected value.

Embodiments of a live data encoding decoding link allows settings within an ESC 530 to be read or changed in real time, while the ESC 530 is running. In order to make these changes a controlling device such as 510 may generate a data tick within a frame to carry data or to control and set the frame. In an embodiment if a controlling device 510 does not make any changes a tick is not generated and this acts as a reset of a data item.

In an embodiment, an ESC 530 cannot write changes to flash while the ESC 530 is running a motor. The ESC 530 waits for an idle state (such as neutral throttle for some amount of time, e.g. 2 seconds) before writing the changes to flash. In an embodiment a new setting received by ESC 530 is used as soon as received, though the setting is not written to flash. In an embodiment a frame of N=64 is used. In an embodiment certain sequence numbers are designated as 'write' registers in which the value received is written to flash and a value response is a copy of a setting value. In an embodiment certain sequence numbers are designated as 'read' registers in which the value response is the result of the read. In an embodiment, the mode of the ESC 530 is determined to be staging or drive by a signal encoded by device 510 and received by device 530.

Figure 6:
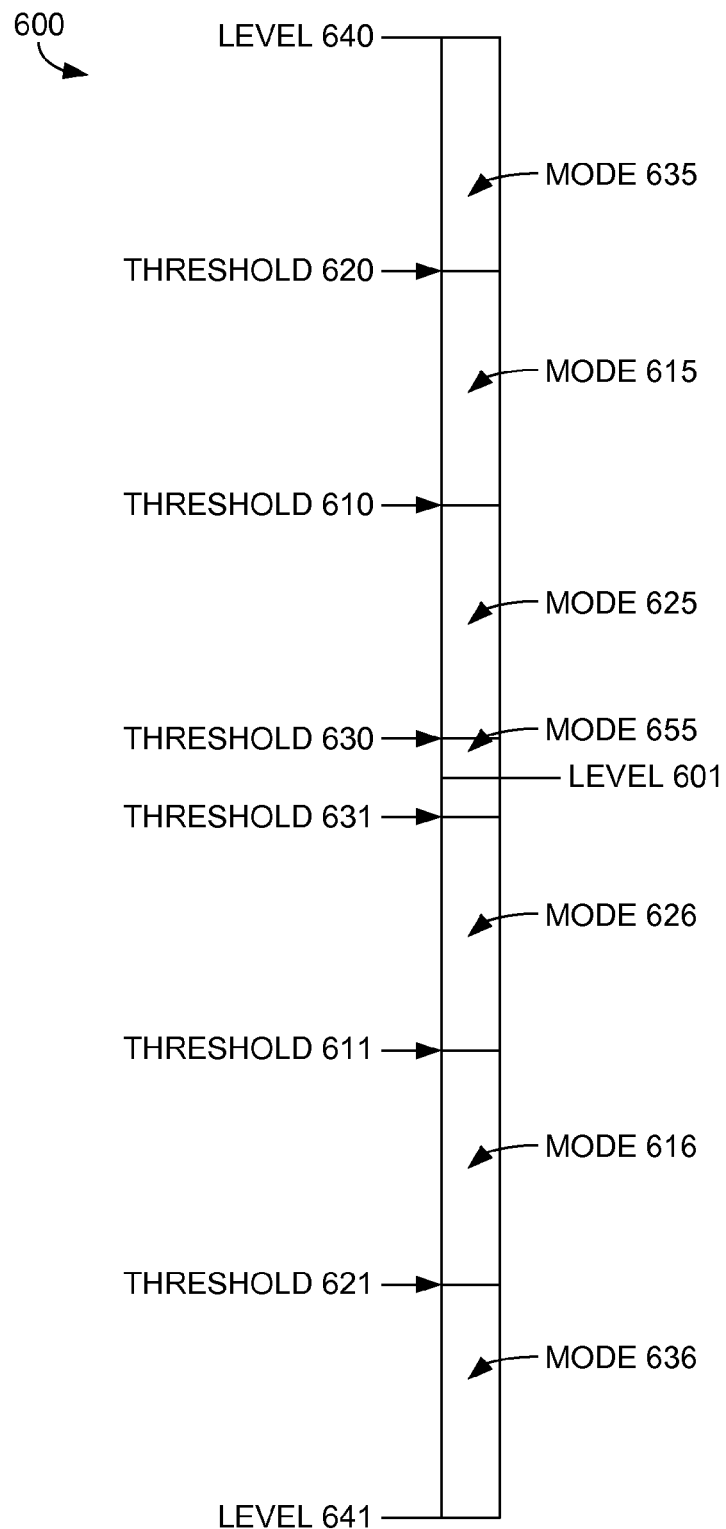
FIG. 6 is a first exemplary mapping of a control-input indication to control modes using thresholds to separate mode selections according to an embodiment as described herein.

An embodiment of ESC 530 processes a single control-input indication (denoted channel-1) such as a PPM input received over connector 531 as illustrated further in conjunction with FIG. 6. Control-input indication mapping 600 illustrates how ESC 530 processes a control-input indication such as a pulse period between minimum level 641 such as 1 ms, and maximum level 640 such as 2 ms. An embodiment of ESC 530 interprets the control-input indication relative to rest level 601 such as 1.5 ms. According to the exemplary embodiment shown in mapping 600, mode 615 is programmed to be a forward-stepping control mode when the channel-1 input indication is above a threshold 610 but below a threshold 620. A first active-holding mode, indicated by mode 625, is engaged by processor 238 when the channel-1 input indication is below threshold 610. When the channel-1 control-input indication is above threshold 620, processor 238 enters mode 635, which controls motor 10 in a closed-loop control mode.

When the control-input indication is within a tolerance (indicated by positive threshold 630 and negative threshold 631 of reference level 601), mode 655 is in a released mode, or inactive mode where the motor is not powered. An embodiment of motor control provides control modes that are symmetric about the reference level 601, so that processor 238 interprets a channel-1 input between threshold 631 and threshold 611 to be a reverse-holding mode in mode 626. Processor 238 interprets a channel-1 input between threshold 611 and 621 to be mode 616 which is a reverse-stepping mode. Processor 238 interprets a channel-1 input between threshold 621 and level 641 to be mode 636 such as a reverse, closed-loop motor-control mode.

An embodiment of motor control chooses threshold 610 and threshold 620 to provide one quarter of the throttle deflection interval from level 601 to level 640 between thresholds

610 and 620. An embodiment of motor control chooses threshold 610 and threshold 620 to provide one quarter of the throttle deflection interval from level 641 to level 640 between thresholds 610 and 620.

An embodiment of ESC 530 provides a time-out holding mode that exercises an active-holding mode when, for a time period less than a predetermined maximum time period, the channel-1 input signal received by ESC 530 drops momentarily from a level above threshold 630 or above threshold 610 to a level between threshold 630 and threshold 631. This feature is employed to advantage when the operator's finger slips off lever 420, allowing the user time to activate lever 420 to an effective level within the predetermined maximum time period before leaving staging mode.

An embodiment of a stepping motor-control mode such as mode 615 determines stepping frequency as a function of the fraction that a channel-1 control-input indication exceeds threshold 610 measured against the entire interval from threshold 610 to threshold 620. An embodiment of a stepping motor-control mode such as 615 determines stepping frequency as a function of the fraction that a channel-1 input-control level falls short of threshold 620 measured against the entire interval from threshold 610 to threshold 620.

An embodiment of a stepping motor-control mode such as mode 615 determines stepping frequency as a function of one or more user-defined settings such as a minimum stepping frequency that corresponds to threshold 610, a maximum stepping frequency that corresponds to threshold 620, as well as six discrete, programmable intermediate points that define intermediate stepping frequencies for channel-1 input levels between threshold 610 and threshold 620. An embodiment of ESC 530 performs staging or running mode according to user-defined programmable settings such as predetermined maximum time for a time-out holding mode, threshold 620, threshold 610 threshold 630, threshold 631, threshold 611, threshold 621, average hold-mode power, power calculation constants, a power mapping function, and a power mapping table.

User-defined settings are loaded into ESC 530 by disconnecting cable 511 from connector 517 and plugging cable 511 into an interface cable of a personal computer or a palmtop computer that is running a parameter-update program in one embodiment. Settings are updated in real time in an embodiment using a live data encoding link communication protocol.

According to an embodiment, two input signal indications are processed by processor 238 to determine the mode of motor control. A second control-input indication (denoted channel-2) is indicated, for example, by switch 560 that communicates switch state to ESC 530 through line 570. In an embodiment of motor control, a state signal is communicated from mode switch 450 as eventually processed and received by ESC 530 through interface 523, or through time-multiplexed channels on connector 531.

Figure 7:
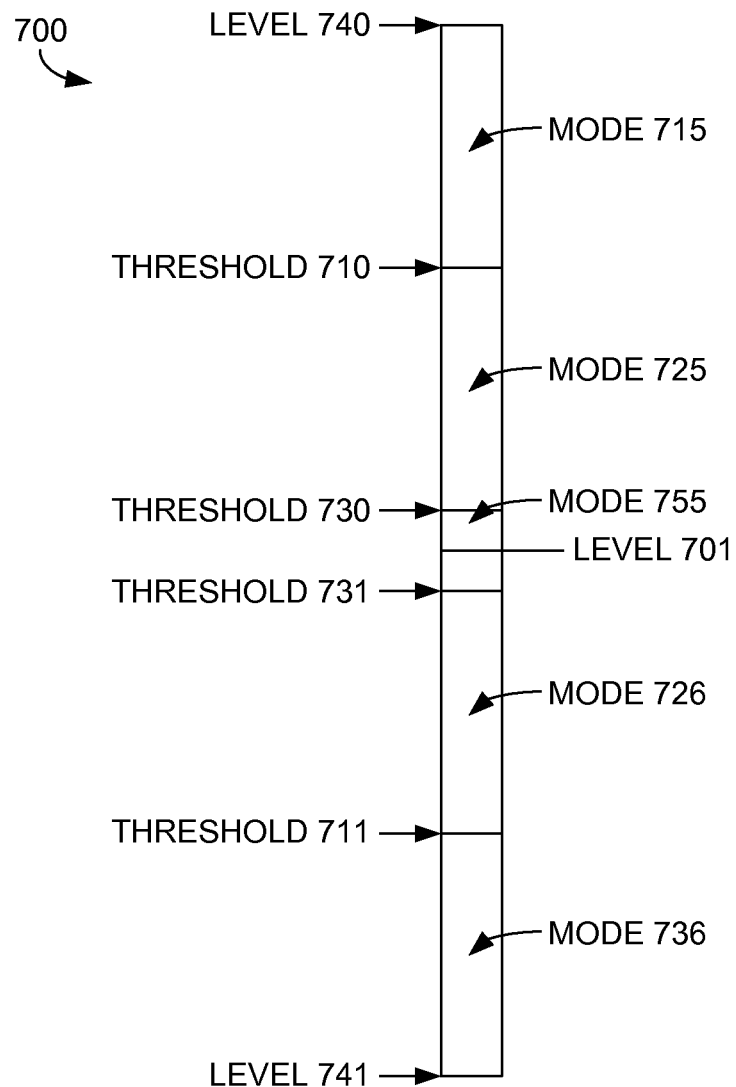
FIG. 7 is a second exemplary mapping of a control-input indication to control modes using threshold to separate mode selections according to an embodiment as described herein.

Turning now to FIG. 7 we see in mapping 700 an example of the ESC 530 processing the channel-1 input in combination with a channel-2 input. ESC 530 processes a channel-1 control-input indication such as a pulse period between minimum level 741 such as 1 ms, and maximum level 740 such as 2 ms. An embodiment of motor control interprets the control-input indication relative to rest level 701 such as 1.5 ms. According to the exemplary embodiment shown in mapping 700, mode 715 is programmed to be a forward-stepping motor-control mode when the channel-1 input indication is above a threshold 710 but below a maximum level 740, in combination with a channel-2 signal such as a PPM signal on connector 523 being above a nominal level such as 1.5 ms.

The ESC 530 receives a control-input indication such as a PPM signal on channel 2 that is above 1.5 ms, indicating a "staging" state has been selected by the user with a switch such as 450. Furthermore, when the ESC 530 receives a channel 2 input indication that is above a 1.5 ms level and in combination receives a channel 1-input signal that is below threshold 710, and above threshold 730, an active-holding control mode such as indicated by mode 725 of FIG. 7. An embodiment of mapping 700 interprets channel 1 input signal levels that are within a tolerance of rest level 701 as a mode in which motor pulsing is inhibited, when channel 2 indicates staging mode. This tolerance is represented as the range between threshold 730 and threshold 731 and represented by mode 755.

An embodiment of the mapping 700 provides reverse active-holding mode denoted by mode 726 when the channel-1 signal indication is between threshold 731 and threshold 711, in combination with a channel-2 switch state that indicates "staging." An embodiment of the mapping 700 provides a reverse-stepping motor-control mode denoted by mode 736 when the channel-1 signal indication is between threshold 711 and level 741, in combination with a channel-2 switch state that indicates "staging."

When an ESC 530 receives a channel-2 control-input indication signal that indicates a "drive" mode (e.g., when a channel-2 PPM signal is below 1.5 ms) the mapping 700 illustrates a drive-mode mapping. An ESC 530 receives a channel-1 signal level as well as a channel-2 level that indicates different motor-control modes as part of a drive mode. An embodiment of ESC 530 maps a channel-1 input level between threshold 710 and level 740 as a closed-loop motor-control mode indicated by mode 715, when the channel-2 signal indicates drive mode. Likewise, a channel-1 input level between level 741 and threshold 711 received by ESC 530 maps the channel-1 level to a reverse closed-loop motor-control mode indicated by mode 736, when the channel-1 input indicates drive mode.

Further, ESC 530 receives a channel-1 signal level between threshold level 730 and threshold level 710, in combination with a channel-2 indication of drive mode, ESC 530 performs motor control in mode 725, which in an embodiment is an active-holding motor-control mode, while in another embodiment mode 725 is an inactive mode in which motor pulsing is inhibited. Likewise, if an ESC 530 receives an indication on channel-2 of a drive mode in combination with a channel-1 input signal level between threshold 731 and threshold 711, ESC 530 controls the motor in an embodiment of mode 726 as a reverse active-holding motor-control mode. In another embodiment, mode 726 controls ESC 530 in an inactive mode, i.e., a mode which inhibits motor pulsing. In an embodiment threshold 710 and threshold 730 are identical, and thresholds 711 and 731 are identical, thus allowing the whole throttle range to control closed-loop power. In an embodiment threshold 710, threshold 711, mode 725 and mode 726 are eliminated from the drive mode.

An embodiment of motor-control mode selection through mapping 700 allows modes and thresholds to be selected by ESC 530 as a function of factors such as coded constants, downloadable constants, and control-input indications such as a channel-2 indication. In an embodiment of motor control, the value of threshold 710 and of mode 725 change under ESC 530 control when the channel-2 signal indicates a staging mode as compared to a driving mode. Likewise, in an embodiment of motor control, the control mapping 600 is similarly used in combination with other signals such as channel signals to define current control mode.

In an embodiment, control receiver 510 is programmable to operate in a number of alternative control-output modes. These modes are programmed, for example, by disconnecting cable 511 at connector 531 and plugging cable 511 into an interface cable of a personal computer or a palmtop computer that is running a parameter-update program. In an embodiment these modes are programmed through a live data link communication protocol in real time. In an embodiment, control receiver 510 provides an output-channel multiplexing mode that places two or more PPM signals on cable 511 for the ESC 530 to receive, but in other alternative modes, provides only a single PPM signal on cable 511.

An embodiment of ESC 530 scales received control-input indications before processing to determine a comparison to a threshold, and to determine selected motor-control mode. An embodiment of ESC 530 buffers control input indications and filters the signals with linear or non-linear operations before determining the mode selection.

The term "user" as described herein may be, without limitation, a consumer, factory personnel, personnel at a reseller, or a technician.

"State" as used herein is generally a discrete system condition such as a two-state switch being in one of two possible states (on or off), or a multistate switch being in a preferred condition, or a continuous input such as a lever being beyond a predetermined level to indicate one of a finite number of conditions.

"Symmetric" modes as used herein indicate the balancing of a forward mode for a reverse mode, such as mode 615 being a forward stepping mode that is symmetric to mode 616, which is a reverse stepping mode. An embodiment of a symmetric mode has different thresholds; for example, with regard to FIG. 6, a symmetric embodiment is able to choose a threshold 611 that is closer to level 601 as compared to the distance of threshold 610 from level 601.

An embodiment of control transmitter 410 and control receiver 510 uses analog and digital modulation/demodulation techniques such as amplitude modulation (AM), frequency modulation (FM), phase modulation (PM), phase-shift keying modulation (PSK), frequency-shift keying modulation (FSK), pulse width modulation (PWM), pulse period modulation (PPM), pulse code modulation (PCM), spread spectrum, etc.

It is to be understood that while an embodiment has been illustrated and described, the description is not limited thereto, except insofar as such limitations are present in the claims.

What is claimed is:

1. One or more computer-readable media having computer-usable instructions embodied thereon that, when executed, enable a given processor to perform a method of controlling a DC motor, said method comprising:
   receiving a first control-input indication;
   controlling a DC motor in a stepping motor-control mode based on said first control-input indication;
   receiving a second control-input indication;
   controlling said motor in an active-holding control mode based on said second control-input indication;
   receiving a third control-input indication; and
   based on said third control-input indication, controlling said motor in a closed-loop motor-control mode that senses commutation state and controls state transition time relative to neutral timing.

2. The computer-readable media of claim 1, further comprising:
   staging a remotely controlled vehicle using said stepping motor-control mode and said active-holding control mode;
   propelling said remotely controlled vehicle under remote control when said vehicle is near a start line of a drag race;
   holding said remotely controlled vehicle near said start line in said active-holding control mode; and
   propelling said remotely controlled vehicle toward a finish line in said closed-loop motor-control mode using timing advance.

3. The computer-readable media of claim 1, further comprising: processing said first control-input indication in part by determining that a first signal is above a first threshold, and below a second threshold; processing said second control-input indication in part by determining that said first signal is below said first threshold; and processing said third control-input indication in part by determining that said first signal is above said second threshold.

4. The computer-readable media of claim 1, wherein said first control-input indication comprises a first signal that is above a first threshold, in combination with a second signal reflecting a first state, and wherein said second control-input indication comprises said first signal that is below said first threshold in combination with said second signal reflecting said first state, and wherein said third control-input indication comprises said first signal that is above a second threshold, in combination with said second signal reflecting a second state.

5. The computer-readable media of claim 3, further comprising determining the stepping frequency in said stepping motor-control mode as a function of the level of said first signal level measured relative to at least one of said first threshold and said second threshold.

6. The computer-readable media of claim 5, wherein said function is defined, at least in part, through at least one predefined setting.

7. The computer-readable media of claim 1 wherein said stepping mode uses a modulation frequency of about 12 kHz.

8. The computer-readable media of claim 3, further comprising determining the average power level in said stepping motor-control mode as a function of the level of said first signal level measured relative to at least one of said first threshold and said second threshold.

9. The computer-readable media of claim 8, wherein said function is defined, at least in part, through at least one predefined setting.

10. The computer-readable media of claim 3, further comprising receiving a fourth control-input indication when said motor is operating in an active-holding motor-control mode, and responsive to receiving said fourth control-input indication, sustaining said active-holding motor-control mode for a predetermined period of time.

11. The computer-readable media of claim 10, wherein said fourth control input indication comprises said first signal that is below a third threshold.

12. The computer-readable media of claim 4, further comprising receiving a fourth control-input indication and responsive to receiving said fourth control-input indication, controlling said motor in a holding mode, wherein said fourth control-input indication comprises said first signal that is below said second threshold, in combination with said second signal reflecting said second state.

13. The computer-readable media of claim 1 wherein an average power level used in one of said active-holding mode and said stepping mode is adjusted as a function of battery voltage-level.

14. The computer-readable media of claim 1, further comprising receiving a fourth control-input indication and responsive to receiving said fourth control-input indication, controlling said motor in a reverse stepping-control mode.

15. The computer readable media of claim 3, wherein said first signal is interpreted to produce forward and reverse operational modes that are symmetric about a rest position, and wherein motor control is inactive when said first signal has absolute magnitude below a third threshold.

16. An apparatus comprising:
an electronic speed-control device comprising: a first interface configured to be coupleable to a DC motor for providing control of a multiphase DC motor,
a second interface configured to be coupleable to a control-input device, and
a third interface configured to be coupleable to said DC motor for sensing commutation state of said DC motor,
wherein said electronic speed-control device is operable to receive a first control-input indication through said second interface and wherein responsive to receiving said first control-input indication said electronic speed-control device is operable to control said DC motor in a stepping motor-control mode through said first interface,
and wherein said electronic speed-control device is operable to receive a second control-input indication through said second interface and wherein responsive to receiving said second control-input indication said electronic speed-control device is operable to control said DC motor in an active-holding control mode through said first interface,
and wherein said electronic speed-control device is operable to receive a third control-input indication through said second interface and wherein responsive to receiving said third control-input indication said electronic speed-control device is operable to control said DC motor through said first interface in a closed-loop motor-control mode that senses commutation state through said third interface and controls state transition time relative to neutral timing through said first interface.

17. The apparatus of claim 16 wherein said electronic speed-control device comprises a processor and computer-readable media having computer-usable instructions embodied thereon that, when executed, enable the given processor to perform DC motor control.

18. The apparatus of claim 16 further comprising: a DC motor coupled to said electronic speed-control device through said first interface and said third interface, a receiver coupled to said electronic speed-control device through said second interface, a battery supplying power to said electronic speed-control device, said DC motor and said receiver, and a remotely controlled vehicle coupled to said motor through a mechanical gear box.

19. One or more computer-readable media having computer-usable instructions embodied thereon that, when executed, enable a given processor to perform a method of controlling a DC motor to propel a remotely controlled vehicle in both a staging mode and in a racing mode for a drag race comprising:
receiving a first control-input indication and responsively controlling a DC motor in a stepping motor-control mode, wherein said stepping motor-control mode is operable to propel a remotely controlled vehicle under remote control when said vehicle is near a first start beam at a drag race start line; and
receiving a second control-input indication and responsively controlling said motor in an active-holding control mode, wherein said active-holding control mode is operable to hold the position of said remotely controlled vehicle after breaking said first start beam, but before breaking a second start beam at said drag race start line.

20. The computer-readable media of claim 19, further comprising:
receiving a third control-input indication and responsively controlling said motor in a closed-loop motor-control mode that senses commutation state and controls state transition time relative to neutral timing, wherein said closed-loop motor-control mode is operable to propel said vehicle after race start toward a finish line in a drag race;
processing said first control-input indication in part by determining that a first signal is above a first threshold, and below a second threshold; and
determining stepping frequency and average power level in said stepping motor-control mode as a function of the level of said first signal level measured relative to at least one of said first threshold and said second threshold.

21. The computer readable media of claim 19, wherein the remotely controlled vehicle is radio-controlled.

* * * * *